(12) United States Patent
Huang

(10) Patent No.: US 11,581,155 B1
(45) Date of Patent: Feb. 14, 2023

(54) ROTARY BUTTON

(71) Applicant: YOTTA INNOVATION CO., LTD., Apia (WS)

(72) Inventor: Stella Huang, Taipei (TW)

(73) Assignee: YOTTA INNOVATION CO., LTD., Apia (WS)

( * ) Notice: Subject to any disclaimer, the term of this patent is extended or adjusted under 35 U.S.C. 154(b) by 0 days.

(21) Appl. No.: 17/398,614

(22) Filed: Aug. 10, 2021

(51) Int. Cl.
*H01H 9/14* (2006.01)
*H01H 19/14* (2006.01)
*H01H 19/04* (2006.01)

(52) U.S. Cl.
CPC ............ *H01H 19/14* (2013.01); *H01H 19/04* (2013.01)

(58) Field of Classification Search
CPC ........ H01H 19/14; H01H 19/04; H01H 19/56; H01H 9/22
USPC ......................................... 200/329, 330, 336
See application file for complete search history.

(56) References Cited

U.S. PATENT DOCUMENTS

| | | | | |
|---|---|---|---|---|
| 2010/0294632 A1* | 11/2010 | Reddering | ............. | B60K 37/06 200/11 R |
| 2013/0228038 A1* | 9/2013 | Klimecki | ............... | G05G 1/105 74/553 |
| 2018/0239387 A1* | 8/2018 | Liu | ........................ | G05G 1/08 |

* cited by examiner

*Primary Examiner* — Edwin A. Leon
*Assistant Examiner* — Iman Malakooti
(74) *Attorney, Agent, or Firm* — Muncy, Geissler, Olds & Lowe, P.C.

(57) ABSTRACT

A rotary button is provided, including: a housing, a rotating member and an indicating mechanism. The housing includes at least one reference portion. The rotating member defines an axial direction and is non-rotatably disposed on the housing. The rotating member is movable relative to the housing in the axial direction and includes a threaded portion configured to be screwed with a threaded rod. The indicating mechanism is disposed on the housing and is axially interferable with the rotating member. The indicating mechanism includes at least one indicating portion. When the housing is rotated to drive the rotating member to move relative to the threaded rod and be abutted against an external object, the rotating member is axially interfered with the indicating mechanism and drives at least one said indicating portion to correspond to at least one said reference portion.

9 Claims, 6 Drawing Sheets

ROTARY BUTTON

BACKGROUND OF THE INVENTION

Field of the Invention

The present invention relates to a rotary button.

Description of the Prior Art

A conventional rotary button is configured to be screwed to a threaded rod, and the threaded rod may be fixed to a first member and movably disposed through a second member. Therefore, the second member can be urged toward the first member by rotation and movement of the rotary button relative to the threaded rod so as to be assembled with each other or clamp an external object disposed therebetween.

However, if the rotary button is over turned, components of the rotary button, the first member, the second member and the external object may be easy to damage. If the rotary button is not turned tight enough, the first member and the second member provide insufficient clamping force and poor assembling stability.

The present invention is, therefore, arisen to obviate or at least mitigate the above-mentioned disadvantages.

SUMMARY OF THE INVENTION

The main object of the present invention is to provide a rotary button, which has indication effect to provide appropriate strength of urging force.

To achieve the above and other objects, the present invention provides a rotary button, including: a housing, a rotating member and an indicating mechanism. The housing includes at least one reference portion. The rotating member defines an axial direction and is non-rotatably disposed on the housing. The rotating member is movable relative to the housing in the axial direction and includes a threaded portion configured to be screwed with a threaded rod. The indicating mechanism is disposed on the housing and is axially interferable with the rotating member. The indicating mechanism includes at least one indicating portion. When the housing is rotated to drive the rotating member to move relative to the threaded rod and be abutted against an external object, the rotating member is axially interfered with the indicating mechanism and drives at least one said indicating portion to correspond to at least one said reference portion.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
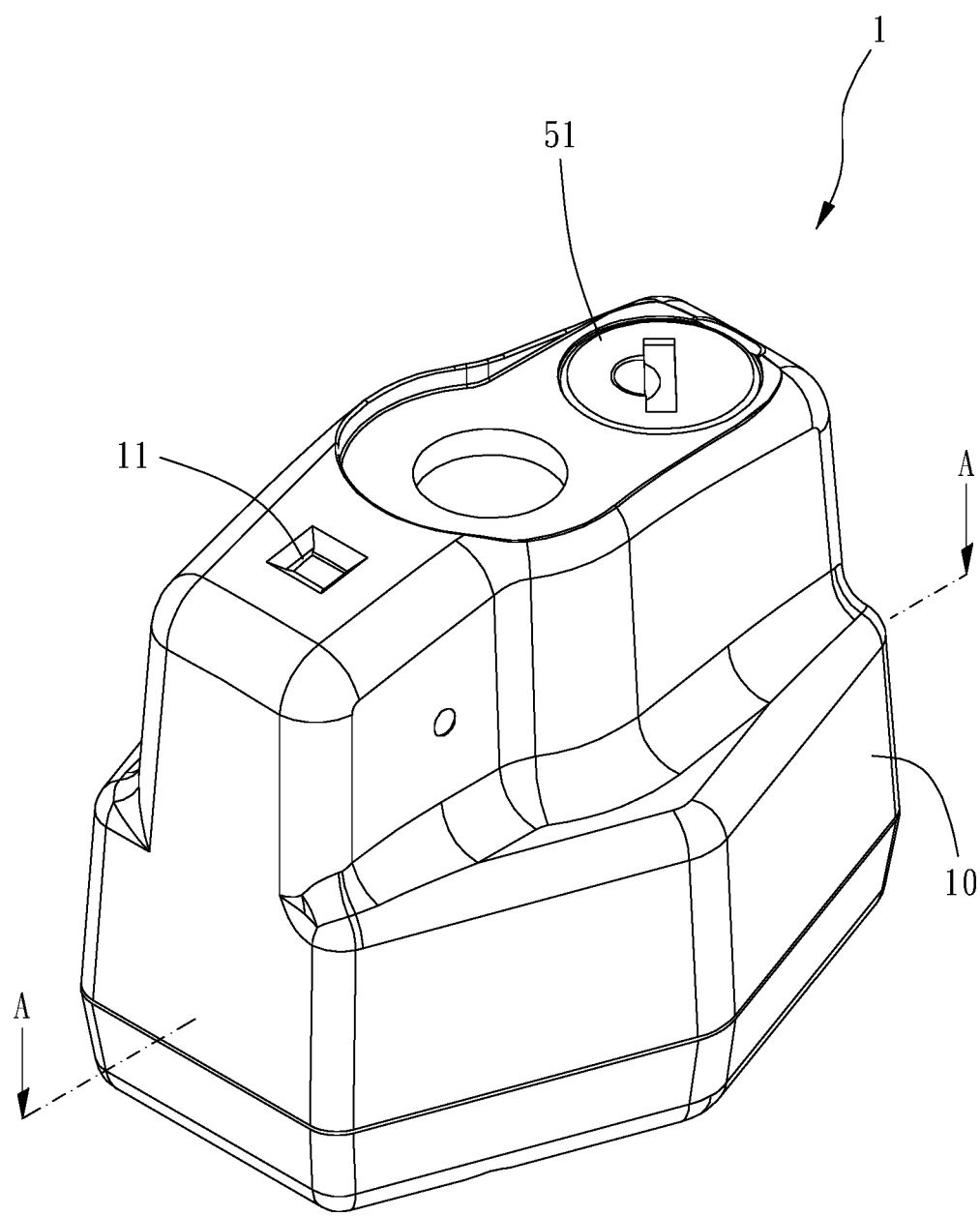
FIG. 1 is a stereogram of a preferable embodiment of the present invention.
Figure 2:
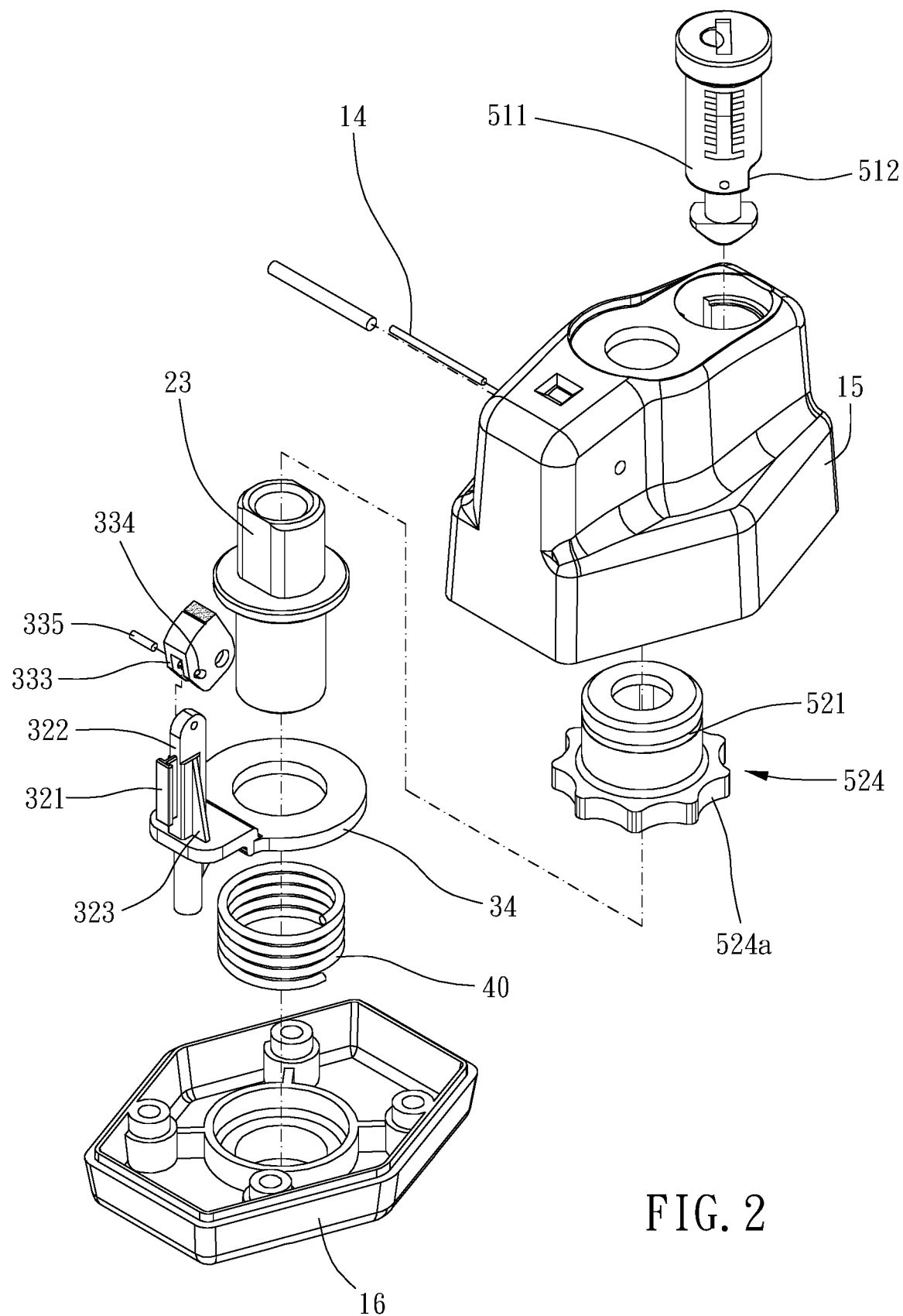
FIG. 2 is a breakdown drawing of a preferable embodiment of the present invention.
Figure 3:
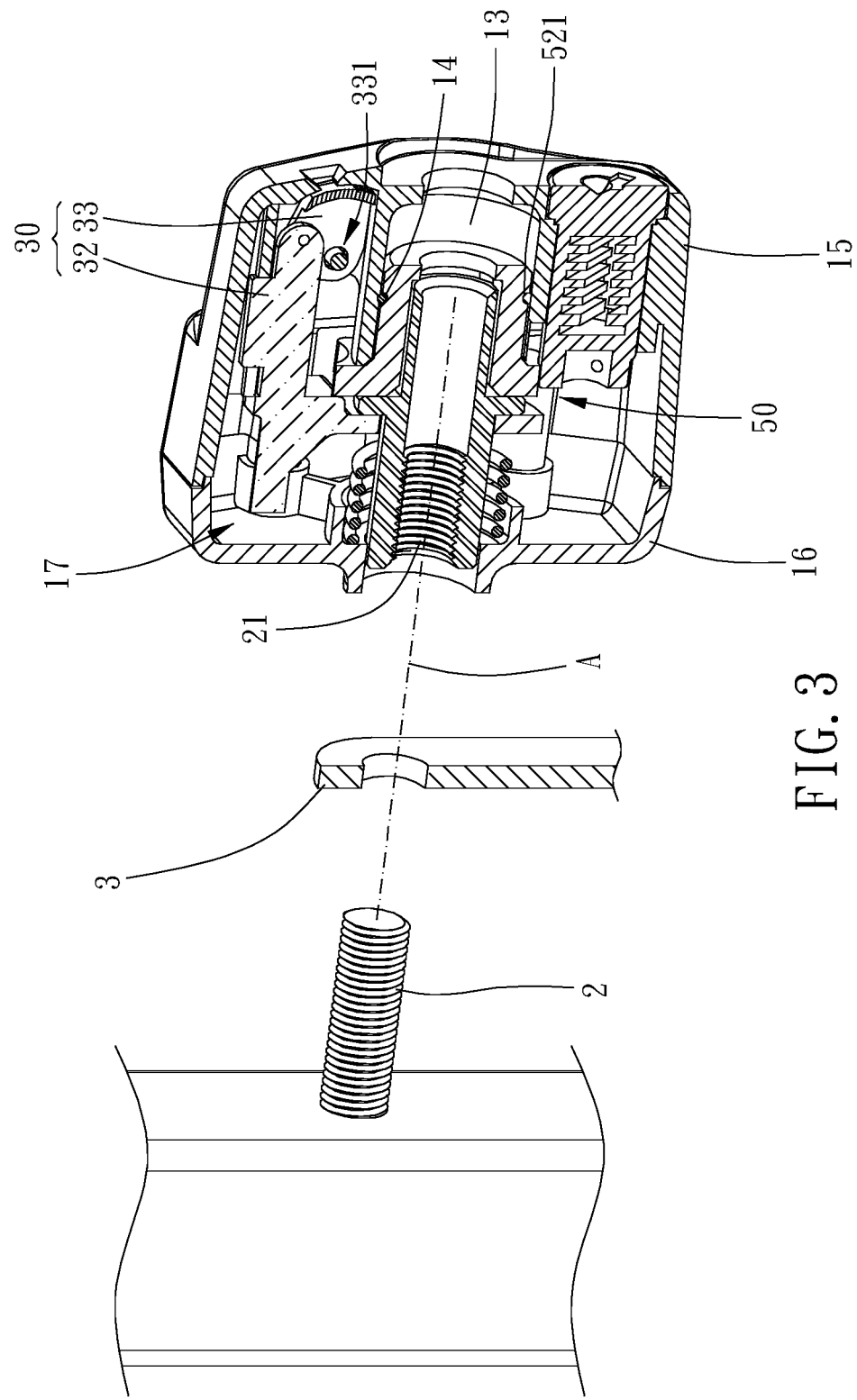
FIG. 3 is a schematic diagram of a preferable embodiment of the present invention in use.

Please refer to FIGS. 1 to 6 for a preferable embodiment of the present invention. A rotary button 1 of the present invention includes a housing 10, a rotating member 20 and an indicating mechanism 30.

The housing 10 includes at least one reference portion 11. The rotating member 20 defines an axial direction A and is non-rotatably disposed on the housing 10. The rotating member 20 is movable relative to the housing 10 in the axial direction A and includes a threaded portion 21 configured to be screwed with a threaded rod 2. The indicating mechanism 30 is disposed on the housing 10 and is axially interferable with the rotating member 20. The indicating mechanism 30 includes at least one indicating portion 31. When the housing 10 is rotated to drive the rotating member 20 to move relative to the threaded rod 2 and be abutted against an external object 3, the rotating member 20 is axially interfered with the indicating mechanism 30 and drives at least one said indicating portion 31 to correspond to at least one said reference portion 11. Therefore, strength of urging force exerted by the housing 10 to the external object 3 can be confirmed when the rotary button 1 is operated to move relative to the threaded rod 2. An end of the threaded rod 2 is immovably disposed on a mounting surface, and the external object 3 is movably disposed on the threaded rod 2. The mounting surface may be disposed on a first arm of a clamping device, and the external object 3 is a second arm of the clamping device so that the second arm can be urged toward the first arm by operation of the rotary button 1.

The indicating mechanism 30 includes a moving member 32 and a swinging member 33 having the at least one indicating portion 31 disposed thereon, and the moving member 32 is connected between the rotating member 20 and the swinging member 33 and is movable in the axial direction A. Specifically, the swinging member 33 includes a pivoting portion 331 rotatably connected with the housing 10 and a swinging portion 332 located at a side of the pivoting portion 331, and the moving member 32 is movably connected with the swinging portion 332. When the moving member 32 is moved in the axial direction A, the swinging member 33 is swung relatively to allow the at least one said indicating portion 31 to correspond to the at least one said reference portion 11 for indication effect. In this embodiment, the swinging member 33 includes two ear parts 333 parallel to each other, and the swinging portion 332 includes two slots 334 disposed on the two ear parts 333 and a pin 335 penetrating through the two slots 334. The moving member 32 is disposed between the two ear parts 333 so as to provide smooth and stable operation. Each of the two slots 334 preferably extends arcuately, which can avoid unexpected swinging of the swinging member 33. However, the swinging member may be a single plate or any other structures; shapes of the two slots may have other configurations according to requirements.

Preferably, the rotating member 20 includes an annular surface 22 extending radially, and the indicating mechanism 30 includes a sleeving portion 34 sleeved to the rotating member 20. The sleeving portion 34 is axially abuttable against the annular surface 22 so that the rotating member 20 can stably drive the moving member 32 to move axially. The rotary button 1 further includes an elastic member 40 elastically abutted against and between the housing 10 and the indicating mechanism 30 (the elastic member 40 is abutted against the sleeving portion 34 in this embodiment), which allows the sleeving portion 34 to be normally abutted against the rotating member 20 for instantaneous activation of the moving member 32. One of the housing 10 and the moving member 32 has a guiding convex portion 321, and the other of the housing 10 and the moving member 32 has a guiding concave portion 12 movably connected with the guiding convex portion 321. At least one of the guiding convex portion 321 and the guiding concave portion 12 extends in a direction parallel to the axial direction A so as to guide the moving member 32 to stably and instantaneously move in the axial direction A and have smooth operation. In this embodiment, the moving member 32 includes a rod body 322, and the guiding convex portion 321 and the sleeving portion 34 radially protrude integrally from the rod body 322; at least one rib 323 is disposed between the rod body 322 and the sleeving portion 34 so as to have good structural strength.

Figure 4:
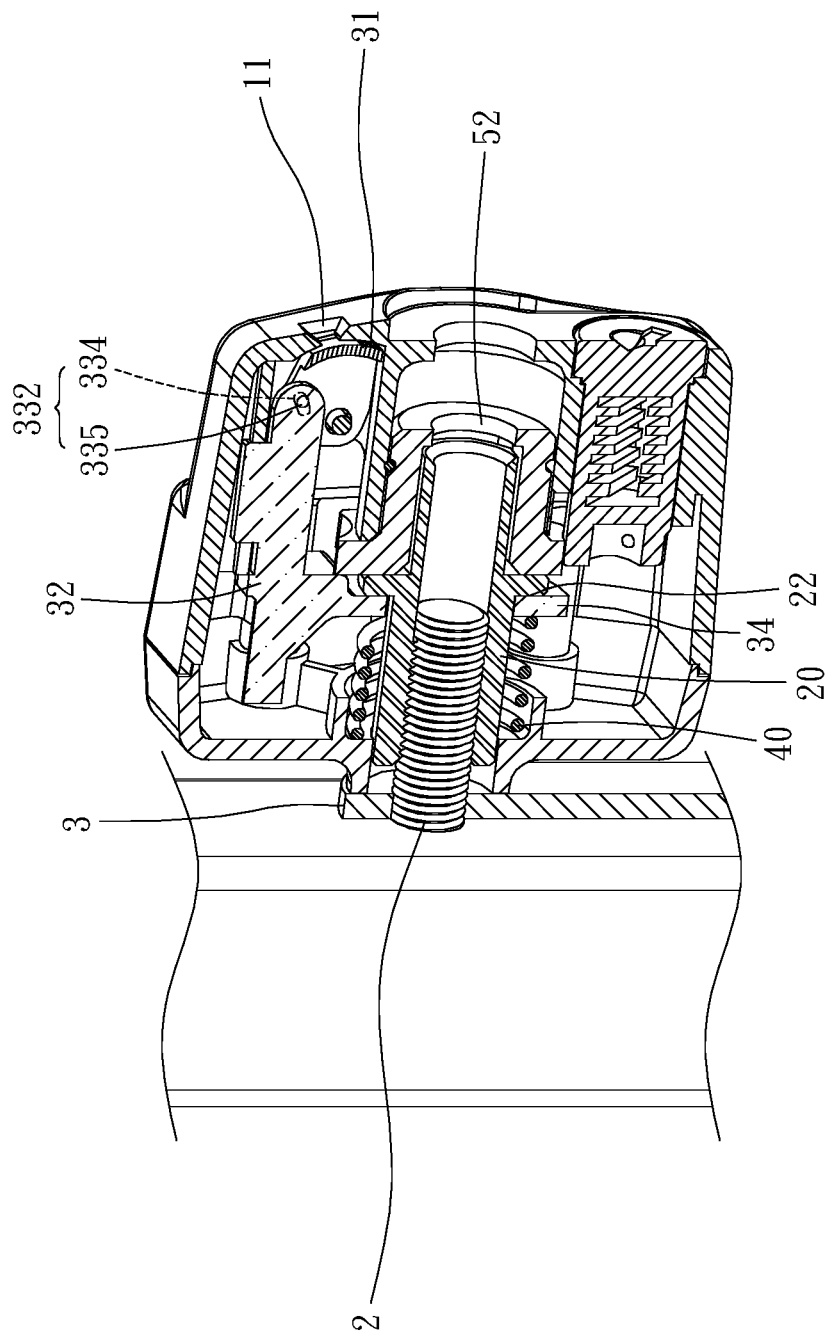
FIGS. 4 and 5 are drawings showing operation according to a preferable embodiment of the present invention.
Figure 5:
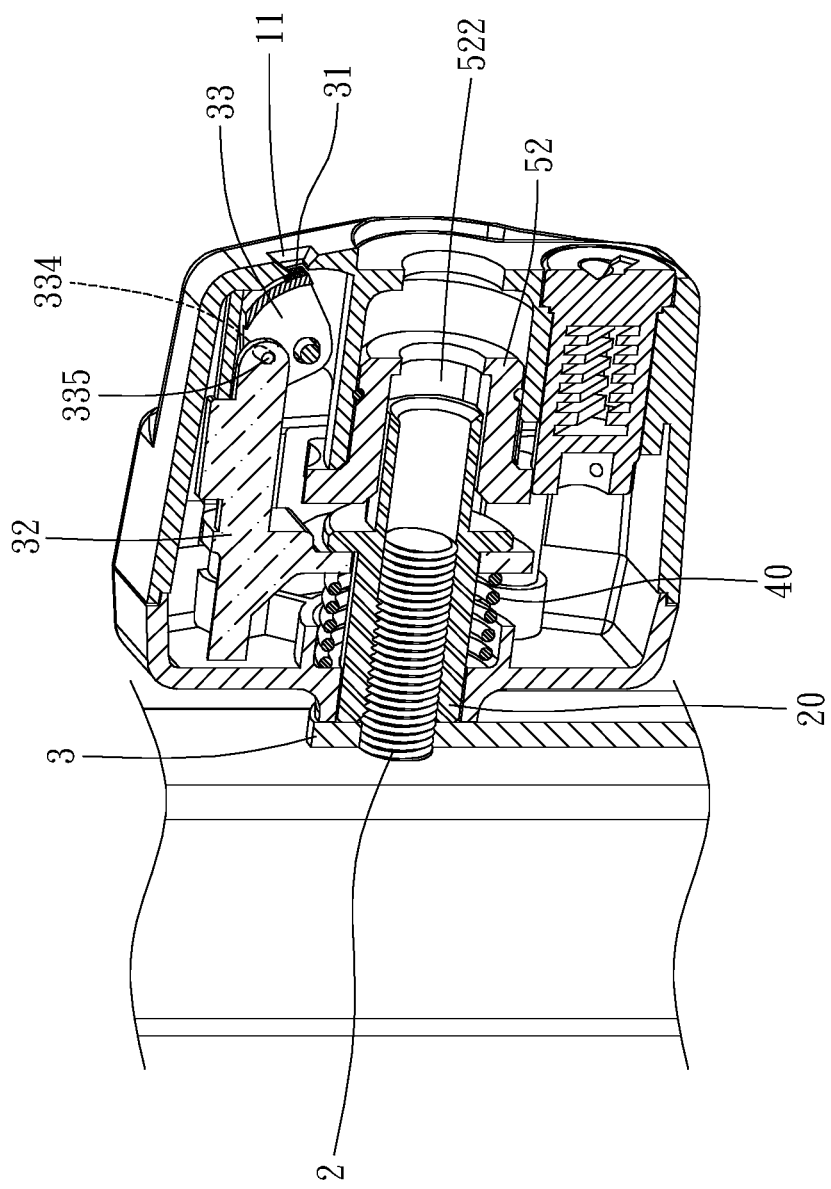

In this embodiment, the at least one reference portion 11 is a viewable window disposed on the housing 10, and the at least one indicating portion 31 is a color block. When the threaded portion 21 is screwed to the threaded rod 2 and the rotating member 20 is free of contact with the external object 3, the color block is dislocated from the viewable window, as shown in FIG. 4. When the housing 10 is continuously rotated to drive the rotating member 20 to compress the elastic member 40 and be abutted against the external object 3, the annular surface 22 drives the sleeving portion 34 to move the moving member 32 in a direction away from the viewable window, and the pin 335 drives the swinging member 33 to swing, which allows the color block to correspond to the viewable window and expose outwardly, as shown in FIG. 5, so as to avoid over rotation causing damage to components. In other embodiments, the at least one indicating portion may include a plurality of color blocks, numbers, marked scales, patterns, or the like.

The rotary button 1 further includes a locking mechanism 50, and the locking mechanism 50 includes a lockset 51 disposed on the housing 10 and a restricting member 52 co-rotatably connected with the rotating member 20. The lockset 51 is configured to be driven by a key to move relative to the restricting member 52 between a locked position and an unlocked position. When the lockset 51 is in the locked position, the lockset 51 is free of interference with the restricting member 52 in a rotation direction of the restricting member 52, and the rotating member 20 is non-drivable by the housing 10. When the lockset 51 is in the unlocked position, the lockset 51 is abutted against the restricting member 52 in the rotation direction, and the rotating member 20 is drivable by the housing 10 to rotate so that the rotary button 1 has anti-theft effect.

Figure 6:
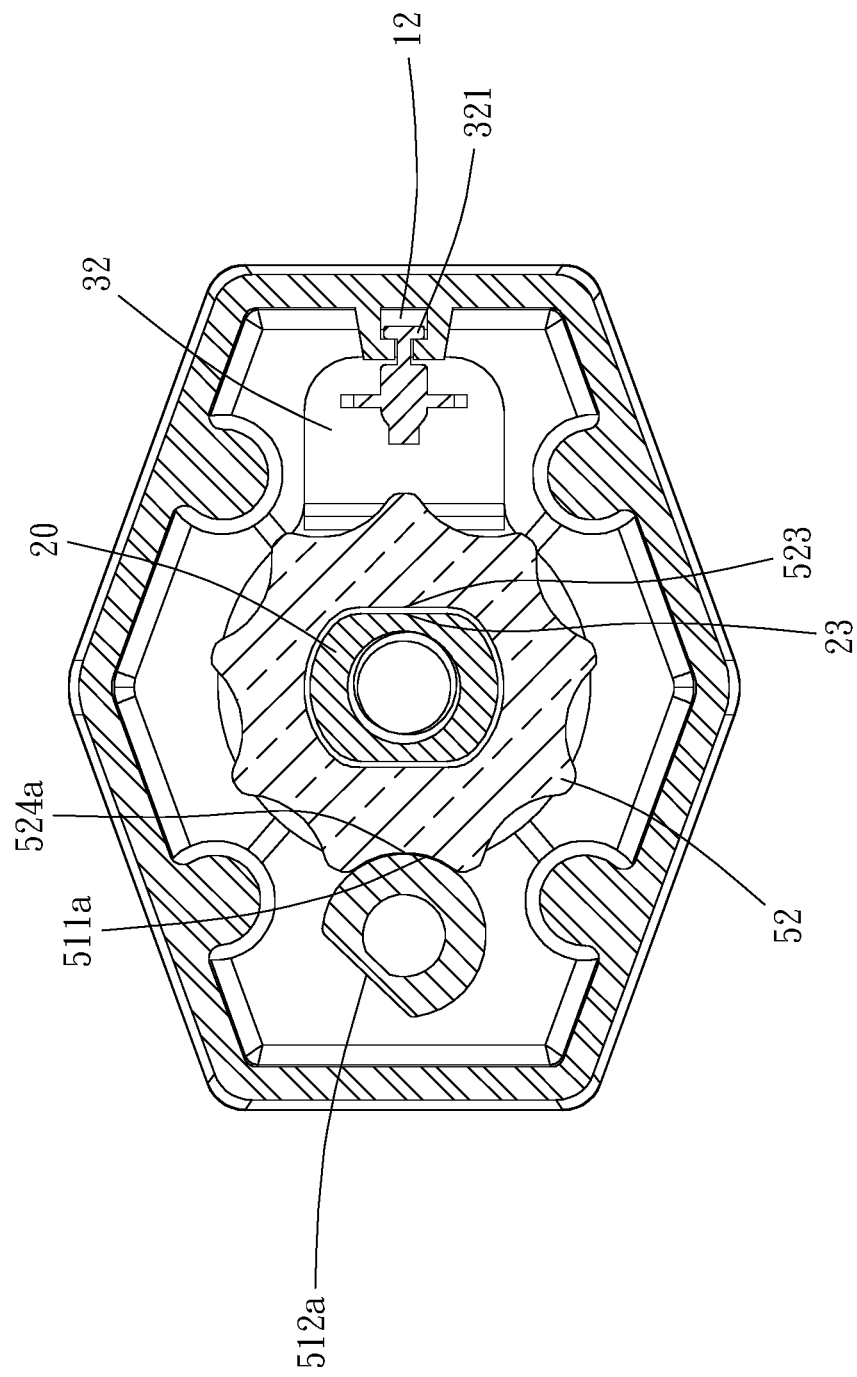
FIG. 6 is a cross sectional view taken along line A-A of FIG. 1.

The housing 10 further includes a sleeving hole 13, and the restricting member 52 is rotatably disposed within the sleeving hole 13 and sleeved to the rotating member 20. Specifically, an outer circumferential wall of the restricting member 52 has an annular groove 521 radially extending inward, and the housing 10 further includes at least one engaging member 14 protruding radially into the sleeving hole 13. The at least one engaging member 14 is partially embedded within the annular groove 521, and the at least one engaging member 14 may be pins, balls, C-shaped retainers, O-rings, or the like so as to block the restricting member 52 in the axial direction A. The restricting member 52 includes an insertion portion 522 extending in the axial direction A, and the insertion portion 522 includes at least one first abutting surface 523 extending in a direction parallel to the axial direction A. The rotating member 20 is disposed within the insertion portion 522 and includes at least one second abutting surface 23 abutted against the at least one first abutting surface 523 so that the restricting member 52 is co-rotatable with the rotating member 20, which has a simple structure and is easy to process and assembling. The restricting member 52 includes a first engaging portion 524, and the lockset 51 includes a second engaging portion 511 and a dodge portion 512. In this embodiment, the first engaging portion 524 includes a plurality of arcuate concave surfaces 524a disposed on the outer circumferential wall of the restricting member 52, and the second engaging portion 511 includes an arcuate convex surface 511a being correspondable to one of the plurality of arcuate concave surfaces 524a. The dodge portion 512 includes a flat surface 512a. When the lockset 51 is in the locked position, the dodge portion 512 faces the first engaging portion 524, and the lockset 51 is free of interference with the rotating member 20. When the lockset 51 is in the unlocked position, the first engaging portion 524 is engaged with the second engaging portion 511, as shown in FIG. 6, so that the housing 10 and the rotating member 20 are stably co-movable with each other.

The housing 10 includes a first member 15 and a second member 16 connected with each other, and the first member 15 and the second member 16 define a receiving space 17 therebetween. The rotating member 20, the indicating mechanism 30 and the locking mechanism 50 are received in the receiving space 17, which is convenient to be assembled and prevents components from external collision.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A rotary button, including:
  a housing, including at least one reference portion;
  a rotating member, defining an axial direction, non-rotatably disposed on the housing and being movable relative to the housing in the axial direction, the rotating member including a threaded portion configured to be screwed with a threaded rod; and
  an indicating mechanism, disposed on the housing and being axially interferable with the rotating member, the indicating mechanism including at least one indicating portion;
  wherein when the housing is rotated to drive the rotating member to move relative to the threaded rod and be abutted against an external object, the rotating member is axially interfered with the indicating mechanism and drives at least one said indicating portion to correspond to at least one said reference portion;
  wherein the rotary button further includes a locking mechanism, the locking mechanism includes a lockset disposed on the housing and a restricting member co-rotatably connected with the rotating member, the lockset is movable relative to the restricting member between a locked position and an unlocked position; when the lockset is in the locked position, the lockset is free of interference with the restricting member in a rotation direction of the restricting member, and the rotating member is non-drivable by the housing; and when the lockset is in the unlocked position, the lockset is abutted against the restricting member in the rotation direction, and the rotating member is drivable by the housing to rotate.

2. The rotary button of claim 1, wherein the indicating mechanism includes a moving member and a swinging member having the at least one indicating portion disposed thereon, and the moving member is connected between the rotating member and the swinging member and is movable in the axial direction.

3. The rotary button of claim 2, wherein the swinging member includes a pivoting portion rotatably connected with the housing and a swinging portion located at a side of the pivoting portion, and the moving member is movably connected with the swinging portion.

4. The rotary button of claim 2, wherein one of the housing and the moving member has a guiding convex portion, the other of the housing and the moving member has a guiding concave portion movably connected with the guiding convex portion, and at least one of the guiding convex portion and the guiding concave portion extends in a direction parallel to the axial direction.

5. The rotary button of claim 1, wherein the rotating member includes an annular surface extending radially, the indicating mechanism includes a sleeving portion sleeved to the rotating member, and the sleeving portion is axially abuttable against the annular surface.

6. The rotary button of claim 1, further including an elastic member elastically abutted against and between the housing and the indicating mechanism.

7. The rotary button of claim 1, wherein the housing further includes a sleeving hole, and the restricting member is rotatably disposed within the sleeving hole and sleeved to the rotating member.

8. The rotary button of claim 1, wherein the restricting member includes a first engaging portion, the lockset includes a second engaging portion and a dodge portion; when the lockset is in the locked position, the dodge portion faces the first engaging portion; and when the lockset is in the unlocked position, the first engaging portion is engaged with the second engaging portion.

9. The rotary button of claim 3, wherein the swinging member includes two ear parts parallel to each other, the swinging portion includes two slots disposed on the two ear parts and a pin penetrating through the two slots, the moving member is disposed between the two ear parts; one of the housing and the moving member has a guiding convex portion, the other of the housing and the moving member has a guiding concave portion movably connected with the guiding convex portion, and at least one of the guiding convex portion and the guiding concave portion extends in a direction parallel to the axial direction; the rotating member includes an annular surface extending radially, the indicating mechanism includes a sleeving portion sleeved to the rotating member, and the sleeving portion is axially abuttable against the annular surface; the moving member includes a rod body, the guiding convex portion and the sleeving portion radially protrude from the rod body; at least one rib is disposed between the rod body and the sleeving portion; the rotary button further includes an elastic member elastically abutted against and between the housing and the sleeving portion; the housing further includes a sleeving hole, the restricting member is rotatably disposed within the sleeving hole and sleeved to the rotating member; the restricting member includes a first engaging portion, the lockset includes a second engaging portion and a dodge portion; when the lockset is in the locked position, the dodge portion faces the first engaging portion; and when the lockset is in the unlocked position, the first engaging portion is engaged with the second engaging portion; the first engaging portion includes a plurality of arcuate concave surfaces disposed on an outer circumferential wall of the restricting member, the second engaging portion includes an arcuate convex surface being correspondable to one of the plurality of arcuate concave surfaces, the dodge portion includes a flat surface; the outer circumferential wall of the restricting member further has an annular groove radially extending inward, the housing further includes at least one engaging member protruding radially into the sleeving hole, the at least one engaging member is partially embedded within the annular groove; the restricting member includes an insertion portion extending in the axial direction, the insertion portion includes at least one first abutting surface extending in a direction parallel to the axial direction, the rotating member is disposed within the insertion portion and includes at least one second abutting surface abutted against the at least one first abutting surface; and the housing includes a first member and a second member connected with each other, the first member and the second member define a receiving space therebetween, and the rotating member and the indicating mechanism are received in the receiving space.

\* \* \* \* \*